(12) United States Patent
Yoshino et al.

(10) Patent No.: US 10,428,875 B2
(45) Date of Patent: Oct. 1, 2019

(54) COOLING STRUCTURE FOR BEARING DEVICE

(71) Applicant: NTN CORPORATION, Osaka (JP)

(72) Inventors: Masato Yoshino, Kuwana (JP); Yuushi Onda, Kuwana (JP); Yohei Yamamoto, Kuwana (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/263,888

(22) Filed: Sep. 13, 2016

(65) Prior Publication Data

US 2016/0377123 A1  Dec. 29, 2016

Related U.S. Application Data

(63) Continuation of application No. PCT/JP2015/056967, filed on Mar. 10, 2015.

(30) Foreign Application Priority Data

Mar. 22, 2014 (JP) ................................. 2014-059358
Mar. 22, 2014 (JP) ................................. 2014-059359

(51) Int. Cl.
*F16C 37/00* (2006.01)
*F16C 33/58* (2006.01)
(Continued)

(52) U.S. Cl.
CPC .......... *F16C 37/007* (2013.01); *B23Q 11/123* (2013.01); *B23Q 11/127* (2013.01);
(Continued)

(58) Field of Classification Search
CPC .... F16C 37/00; F16C 37/007; F16C 33/6662; F16C 33/667; F16C 33/6681; F16C 33/76;
(Continued)

(56) References Cited

U.S. PATENT DOCUMENTS

| 3,149,890 | A | * | 9/1964 | Selby | ................... | F16C 37/007 |
| | | | | | | 384/473 |
| 3,885,842 | A | * | 5/1975 | Furutsu | ................. | F16C 19/388 |
| | | | | | | 384/468 |

(Continued)

FOREIGN PATENT DOCUMENTS

| CN | 1931459 | 3/2007 |
| CN | 101443987 | 5/2009 |

(Continued)

OTHER PUBLICATIONS

Machine Translation of JP 2010-127399 (Year: 2010).*

(Continued)

*Primary Examiner* — Alan B Waits

(57) ABSTRACT

Provided is a cooling structure for a bearing device. The bearing device includes a rolling bearing having a stationary raceway ring and a rotating raceway ring, a stationary spacer adjacent to the stationary raceway ring and a rotating spacer adjacent to the rotating raceway ring. The stationary raceway ring and the stationary spacer are provided in a stationary member, and the rotating raceway ring and the rotating spacer are provided in a rotating member. The cooling structure includes: an annular recessed portion provided on a circumferential surface, of the stationary spacer, that confronts an opposite spacer; and a nozzle hole configured to inject a compressed air from an outlet open to a bottom surface of the recessed portion toward a circumferential surface of the rotating spacer that confronts an opposite spacer. The nozzle hole is inclined forwardly in a rotation direction of the rotating spacer.

5 Claims, 11 Drawing Sheets

(51) Int. Cl.
*F16C 33/66* (2006.01)
*B23Q 11/12* (2006.01)
*F16C 19/16* (2006.01)
*F16C 19/54* (2006.01)

(52) U.S. Cl.
CPC ........ *F16C 33/583* (2013.01); *F16C 33/6662* (2013.01); *F16C 19/163* (2013.01); *F16C 19/548* (2013.01); *F16C 2322/39* (2013.01)

(58) Field of Classification Search
CPC ............... F16C 33/6659; F16C 33/1045; F16C 33/105; F16C 33/583; F16C 19/163; F16C 19/548; B23Q 11/123; B23Q 11/127
See application file for complete search history.

(56) References Cited

U.S. PATENT DOCUMENTS

| | | | | |
|---|---|---|---|---|
| 5,009,523 | A * | 4/1991 | Folger | F16C 19/386 384/475 |
| 5,848,845 | A * | 12/1998 | Jeng | F16C 33/6662 184/6.26 |
| 6,176,349 | B1 * | 1/2001 | Kishi | F16C 19/163 184/55.1 |
| 6,733,181 | B2 * | 5/2004 | Koiwa | F16C 33/6662 384/465 |
| 7,232,258 | B2 * | 6/2007 | Garcia | F16C 19/163 384/476 |
| 7,374,019 | B2 * | 5/2008 | Kosugi | B23Q 11/122 184/6.14 |
| 7,546,782 | B2 | 6/2009 | Adams et al. | |
| 8,117,930 | B2 | 2/2012 | Adams et al. | |
| 8,336,210 | B2 * | 12/2012 | Takiuchi | B23Q 1/70 29/898 |
| 8,403,110 | B2 * | 3/2013 | Suzuki | B23Q 11/123 184/6.26 |
| 8,939,650 | B2 | 1/2015 | Berruet et al. | |
| 9,541,137 | B2 | 1/2017 | Mori et al. | |
| 2003/0147765 | A1 * | 8/2003 | Schlipf | F01C 21/02 418/206.3 |
| 2007/0157749 | A1 | 7/2007 | Adams et al. | |
| 2009/0301373 | A1 | 12/2009 | Adams et al. | |
| 2013/0287547 | A1 | 10/2013 | Berruet et al. | |
| 2015/0226266 | A1 | 8/2015 | Mori et al. | |
| 2017/0051790 | A1 | 2/2017 | Mori et al. | |

FOREIGN PATENT DOCUMENTS

| | | | |
|---|---|---|---|
| CN | 103375490 | 10/2013 | |
| EP | 2 657 553 A1 | 10/2013 | |
| EP | 2 910 806 A1 | 8/2015 | |
| JP | 53-26591 | 3/1977 | |
| JP | 63-114846 | 5/1988 | |
| JP | 2000-55063 | 2/2000 | |
| JP | 2000-161375 | 6/2000 | |
| JP | 2000161375 A * | 6/2000 | ............ F16C 37/007 |
| JP | 2000-291674 | 10/2000 | |
| JP | 2000-296439 | 10/2000 | |
| JP | 2008-75882 | 4/2008 | |
| JP | 2010-127399 | 6/2010 | |
| JP | 2011-167799 | 9/2011 | |
| WO | 2007/095403 | 8/2007 | |
| WO | WO-2010035753 A1 * | 4/2010 | ............ F16C 19/26 |

OTHER PUBLICATIONS

International Search Report dated Jun. 16, 2015 in corresponding International Application No. PCT/JP2015/056967.
Extended European Search Report dated Jul. 12, 2017 in corresponding European Patent Application No. 15768644.5.
International Preliminary Report on Patentability dated Oct. 6, 2016 in corresponding International Patent Application No. PCT/JP2015/056967.
Decision of Refusal dated Mar. 20, 2018 in corresponding Japanese Patent Application No. 2014-059358, 3 pages.
Decision of Refusal dated Mar. 20, 2018 in corresponding Japanese Patent Application No. 2014-059359, 3 pages.
Chinese Office Action dated Nov. 28, 2017 in corresponding Chinese Patent Application No. 201580015046.3, 7 pages.
Japanese Notification of Rejection dated Sep. 26, 2017 in corresponding Japanese Patent Application No. 2014-059359.
Japanese Notification of Rejection dated Sep. 26, 2017 in corresponding Japanese Patent Application No. 2014-059358.
Chinese Office Action dated Aug. 22, 2018 in corresponding Chinese Patent Application No. 201580015046.3.
Taiwan Office Action dated Jul. 3, 2018 in corresponding Taiwan Patent Application No. 104108700.
European Communication pursuant to Article 94(3) EPC dated May 29, 2018 in corresponding European Patent Application No. 15 768 644.5.
Japanese Office Action issued Jun. 11, 2019 in related Japanese Patent Application No.: 2018-116808 with machine English translation (8 pages).

* cited by examiner

MASS FLOW RATE: LOW
COMPRESSIONAL WAVE INTENSITY: LOW

MASS FLOW RATE: LOW
COMPRESSIONAL WAVE INTENSITY: LOW

MASS FLOW RATE: HIGH
COMPRESSIONAL WAVE INTENSITY: HIGH

COOLING STRUCTURE FOR BEARING DEVICE

CROSS REFERENCE TO THE RELATED APPLICATION

This application is a continuation application, under 35 U.S.C. § 111(a), of international application No. PCT/JP2015/056967, filed Mar. 10, 2015, which claims priority to Japanese patent application Nos. 2014-059358 and 2014-059359, both filed Mar. 22, 2014, the disclosure of which are incorporated by reference in their entirety into this application.

BACKGROUND OF THE INVENTION

Field of the Invention

The present invention relates to a cooling structure for a bearing device, and relates to a cooling structure for a spindle of a machine tool and a bearing incorporated in the spindle, for example.

Description of Related Art

For spindle devices of machine tools, the temperature increase in the devices needs to be kept small in order to ensure the processing accuracy. However, the speed for the recent machine tools tends to increase in order to improve the processing efficiency, and the amount of heat generated from the bearing that supports the spindle also tends to increase, along with this increase in speed. The so-called motor built-in spindle devices including a driving motor incorporated therein are increasing in number, which also causes heat generation.

A temperature increase in the bearing due to heat generation results in an increased preload, and thus needs to be minimized from the viewpoint of increasing the speed and the precision of the spindle. Examples of the method for suppressing a temperature increase in the spindle device include a method in which compressed air for cooling is supplied to the bearing so as to cool the spindle and the bearing (e.g., Patent Document 1). In Patent Document 1, the spindle and the bearing are cooled by jetting cool air into the space between two bearings at an angle to the rotation direction so as to create a swirl flow.

RELATED DOCUMENT

Patent Document

[Patent Document 1] JP Laid-open Patent Publication No. 2000-161375

SUMMARY OF THE INVENTION

In the case of cooling with compressed air, a greater cooling effect is achieved when the compressed air has a higher flow velocity and a higher flow rate. However, in order to increase the flow velocity and the flow rate of the compressed air, it is necessary to increase the output of an air supply device, resulting in increased power consumption.

In relation to lubrication or the like, cooling with compressed air often cools the spindle and the bearing via an inner ring spacer by spraying the compressed air to the inner ring spacer from a nozzle provided at an outer ring spacer, rather than by directly spraying the cool air to the spindle and the bearing. In that case, the compressed air injected from the nozzle flows along the outer circumferential surface of the inner ring spacer in the axial direction while taking the heat from the inner ring spacer, and is thereafter discharged to the outside of the bearing. The cooling effect of this air-cooling method is greater when the compressed air has a higher flow velocity and a higher flow rate.

However, a nozzle having a simple shape in which the diameter in the vicinity of a nozzle hole outlet is merely reduced is choked at the nozzle hole outlet, so that the flow velocity cannot be higher than the sound velocity. Accordingly, a significant cooling effect cannot be expected. To increase the flow velocity to be higher than the sound velocity, it is necessary to use an ultra-high speed nozzle such as a Laval nozzle whose bore diameter is narrowed at the intermediate portion and slightly varied. However, it is difficult for such a complex nozzle hole to be processed in an outer ring spacer made of a metal material by cutting.

Even if the flow rate of the compressed air is to be increased in order to increase the cooling effect, the flow rate is dependent on the volume of an air compressor, and therefore cannot be increased unlimitedly. By providing an air hole leading to the outside of the bearing device at an intermediate portion of the nozzle hole in the flow direction of the compressed air, the flow rate of the cooling air can be increased by taking in the air from the outside of the bearing. However, as with the above-described case, it is difficult to for the nozzle hole and the air hole to be processed in an outer ring spacer made of a metal material only by cutting.

Furthermore, it may be desirable that the transverse cross section, orthogonal to the flow direction of the compressed air, of the nozzle hole has a non-circular shape. However, in this case as well, it is difficult for the nozzle having a non-circular hole to be processed in an outer ring spacer made of a metal material by cutting.

A first object of the present invention is to provide a cooling structure for a bearing device that can efficiently cool the bearing device while suppressing the power consumption required to supply compressed air.

A second object of the present invention is to provide a cooling structure for a bearing device that can efficiently cool the bearing device with compressed air, and allow a nozzle hole having a shape suitable for a specific use to be formed in a stationary spacer with high accuracy and high productivity.

A cooling structure for a bearing device in accordance with the present invention is applied to a bearing device including a rolling bearing having a stationary raceway ring and a rotating raceway ring opposing inside and outside of the rolling bearing, a stationary spacer adjacent to the stationary raceway ring and a rotating spacer adjacent to the rotating raceway ring, the stationary raceway ring and the stationary spacer being provided in, out of a stationary member and a rotating member, the stationary member, and the rotating raceway ring and the rotating spacer being provided in the rotating member. In the bearing device, the cooling structure includes: an annular recessed portion provided on a circumferential surface, of the stationary spacer, that confronts an opposite spacer; and a nozzle hole configured to inject a compressed air from an outlet open to a bottom surface of the recessed portion toward a circumferential surface of the rotating spacer that confronts an opposite spacer, the nozzle hole being inclined forwardly in a rotation direction of the rotating spacer. For example, the stationary raceway ring may be an outer ring, and the rotating raceway ring may be an inner ring. In that case, the stationary member and the rotating member may be, for example, a housing and a spindle, respectively.

With this configuration, compressed air for cooling is injected from the nozzle hole provided in the stationary spacer toward the circumferential surface of the rotating spacer. By providing the annular recessed portion on the circumferential surface of the stationary spacer at which the spacers oppose each other and providing the nozzle hole such that the outlet is open to the recessed portion, the compressed air is injected into the space between the recessed portion of the stationary spacer and the rotating spacer. As a result of the compressed air being injected from the narrow nozzle hole to the space at one stroke, the compressed air undergoes adiabatic expansion, so that the temperature of the compressed air is reduced and the flow velocity is increased. Accordingly, the rotating spacer can be efficiently cooled.

Since the nozzle hole provided in the stationary spacer is inclined forwardly in the rotation direction of the rotating spacer, the compressed air injected from the nozzle hole flows in the axial direction while swirling along the circumferential surface of the rotating spacer, and is discharged to the outside of the bearing. Since the compressed air swirls, the compressed air is in contact with the circumferential surface of the rotating spacer for a longer time as compared with when the compressed air directly flows in the axial direction, thus making it possible to more efficiently cool the rotating spacer.

In this manner, as a result of the rotating spacer being efficiently cooled, it is possible to effectively cool the inner ring of the rolling bearing and the rotating member via the rotating spacer. This cooling structure can improve the cooling efficiency simply by contriving the structure so as to provide the annular recessed portion on the circumferential surface of the stationary spacer at which the spacers oppose each other and cause the nozzle hole to be inclined. Therefore, it is not necessary to increase the output of the air supply device that supplies the compressed air, making it possible to suppress the power consumption.

The compressed air injected into the space between the recessed portion of the stationary spacer and the rotating spacer is discharged through the clearance between the stationary spacer and the rotating spacer located on opposite sides of the recessed portion to the outside of the bearing. At this time, at least a part of the compressed air flows into the bearing. Since the clearance is narrower than the space, the flow velocity of the compressed air flowing through the clearance is made uniform at various portions in the circumferential direction, so that the flow velocity of the compressed air flowing into the bearing is made uniform. Accordingly, it is possible to reduce the collision noise between the compressed air and a rotating rolling element.

For example, the recessed portion may be an annular groove having a rectangular cross section. The annular groove having a rectangular cross section can be easily processed.

The recessed portion may be an annular groove having a chevron-shaped cross section in which a portion formed with the outlet of the nozzle hole is most recessed, and a recessed amount gradually decreases from the most recessed portion toward at least one side in an axial direction. In this case, it is possible to suppress the resistance of the compressed air flowing out of the space between the recessed portion of the stationary spacer and the rotating spacer, making the flow velocity of the compressed air flowing into the bearing more uniform.

In one embodiment of the present invention, a portion of the stationary spacer that constitutes a bottom surface of the recessed portion may be formed separately from other portions of the stationary spacer. In this case, the stationary spacer is formed by combining a plurality of members having relatively simple shapes, so that the processing is facilitated.

In the cooling structure for a bearing device as described in any one of the above-described aspects of the invention, a portion of the stationary spacer that constitutes the nozzle hole may be formed separately from another portion, and the nozzle hole may have a transverse cross section orthogonal to a flow direction of the compressed air and a longitudinal cross section along the flow direction of the compressed air, in which one or both of the cross sections may have a non-uniform shape. For example, the stationary raceway ring may be an outer ring, and the rotating raceway ring may be an inner ring. In that case, the stationary member and the rotating member may be, for example, a housing and a shaft, respectively.

With this configuration, by injecting the compressed air for cooling from the nozzle hole provided in the stationary spacer toward the circumferential surface of the rotating spacer, the rotating spacer is first cooled, and the rotating raceway ring of the rolling bearing and the rotary shaft are cooled via the rotating spacer. Since the nozzle hole provided in the stationary spacer is inclined forwardly in the rotation direction of the rotating spacer, the compressed air injected from the nozzle hole flows in the axial direction while swirling along the circumferential surface of the rotating spacer, and is discharged to the outside of the bearing. Since the compressed air swirls, the compressed air is in contact with the circumferential surface of the rotating spacer for a longer time as compared with when the compressed air linearly flows in the axial direction, thus making it possible to efficiently cool the rotating spacer. Accordingly, the effect of cooling the bearing device and the rotary shaft is enhanced.

By separating a portion of the stationary spacer that constitutes the nozzle hole from said another portion, the portion forming the nozzle hole can be produced with a material that can be processed easily, such as a resin material. Accordingly, the nozzle hole in which one or both of the transverse cross section orthogonal to the flow direction of the compressed air and the longitudinal cross section along the flow direction of the compressed air have a non-uniform shape can be provided in the stationary spacer with high accuracy and high productivity. Although it is difficult for such a nozzle hole to be processed by cutting, the nozzle hole can be easily produced by injection molding a resin material. Since the transverse cross section or the longitudinal cross section of the nozzle hole has a non-uniform shape, it is possible to form a nozzle hole having various shapes suitable for high-speed jetting.

In one embodiment of the present invention, the stationary spacer may include a plurality of the nozzle holes in a circumferential direction, and a portion constituting each of the nozzle holes may be individually fitted into a fitting hole provided in the another portion. When a common portion is used to form the nozzle holes, the portion forming the nozzle holes has an annular shape or a shape close to an annular shape, resulting in a form in which the other portion is divided into axially opposite side portions by the portion forming the nozzle holes disposed in between. With this form, the rigidity of the stationary spacer in the axial direction is reduced when the portion forming the nozzle holes is a resin material. With a form in which the portion forming each of the nozzle holes is individually fitted into the fitting hole provided in said another portion, said another portion is not split to opposite sides in the axial direction, so that it is possible to prevent a reduction in the rigidity of the stationary spacer in the axial direction.

In one embodiment of the present invention, a transverse cross-sectional shape in the vicinity of the outlet of the nozzle hole may be a flattened shape having an axial dimension longer than a circumferential dimension. The flattened shape as used herein is not limited to a flat shape having an excessively longer dimension along the axial direction than the dimension along the circumferential direction of the bearing, and includes a shape having a slightly longer axial dimension than the circumferential dimension. When a large amount of the compressed air is injected from the nozzle hole toward the rotating spacer, the flow velocity of the compressed air reaches the maximum speed (e.g., a sound velocity) at the outlet of the nozzle hole. At this time, when the clearance between the outlet of the nozzle hole and the rotating spacer is narrow and the transverse cross-sectional shape in the vicinity of the outlet of the nozzle hole is a circular shape, the pressure between the outlet of the nozzle hole and the stationary spacer tends to be increased, so that compressional waves are generated. When compressional waves are generated, a direct flow of the compressed air injected from the outlet of the nozzle hole is impeded, and the compressed air diffuses in the axial direction. Accordingly, the time for which the compressed air is in contact with the circumferential surface of the rotating spacer is shortened, resulting in a reduction in the cooling effect.

It is considered that compressional waves tend to be generated when the transverse cross-sectional shape in the vicinity of the outlet of the nozzle hole is a circular shape since the inflow amount (mass flow rate) of the compressed air into the clearance between the outlet of the nozzle hole and the rotating spacer is locally increased at the central portion in the axial direction that is an extension of the center of the nozzle hole. When the transverse cross-sectional shape in the vicinity of the outlet of the nozzle hole is a flattened shape, the inflow amount of the compressed air is made uniform in the axial direction. Accordingly, intense compressional waves will not be generated, allowing the compressed air to flow in the circumferential direction without diffusing in the axial direction.

In one embodiment of the present invention, the longitudinal cross section of the nozzle hole may have a shape in which an intermediate portion in a length direction is narrow so as to enable a supersonic flow. In this case, the flow velocity of the compressed air injected from the nozzle hole is increased, so that the cooling effect is improved.

In the present invention, an air hole fluidly communicating with the outside of the bearing device may be provided at an intermediate portion, of the nozzle hole, in the flow direction of the compressed air. In this case, by a negative pressure generated by a dynamic pressure of the compressed air flowing through the nozzle hole, the air from the outside of the bearing device is sucked through the air hole into the nozzle hole. Accordingly, the flow rate injected from nozzle hole is increased, so that the cooling effect is improved.

The cooling structure for a bearing device according to the present invention has the above-described operation and effect, and therefore can be suitably used for a support of a spindle of the machine tool.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

A cooling structure for a bearing device according to a first embodiment of the present invention will be described with reference to FIGS. 1 to 3. The cooling structure for a bearing device of the present example is applied to a spindle device of a machine tool. It should be noted, however, that the present invention is not solely applied to a spindle device of a machine tool.

Figure 1:
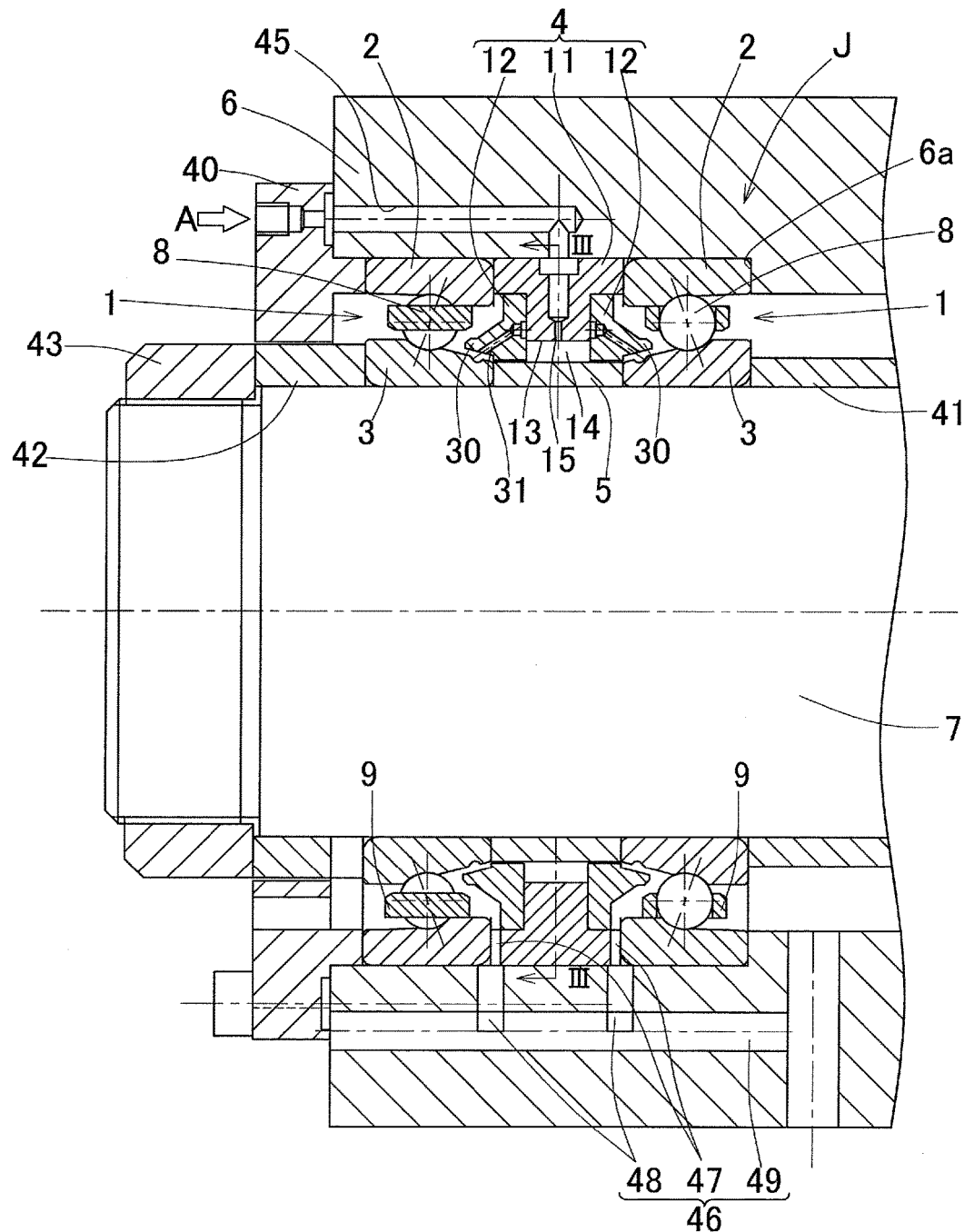
FIG. 1 is a longitudinal cross sectional view of a machine tool spindle device including a cooling structure for a bearing device according to a first embodiment of the present invention.

As shown in FIG. 1, a bearing device J includes two rolling bearings 1, 1 arranged in the axial direction, having respective outer rings 2, 2 and inner rings 3, 3. An outer ring spacer 4 and an inner ring spacer 5 are interposed between the outer rings 2, 2 and the inner rings 3, 3, respectively. The outer rings 2 and the outer ring spacer 4 are provided in a housing 6, and the inner rings 3 and the inner ring spacer 5 are fitted to a spindle 7. Each rolling bearing 1 is formed as an angular ball bearing, and a plurality of rolling elements 8 are interposed between raceways of the inner and outer rings 3 and 2. The rolling elements 8 are retained equidistantly in the circumferential direction by a retainer 9. The two rolling bearings 1, 1 are disposed so as to be combined back-to-back to each other, and an initial preload for the rolling bearings 1, 1 is adjusted according to the difference in width dimension between the outer ring spacer 4 and the inner ring spacer 5. In the present embodiment, each rolling bearing 1 is used in an inner ring-rotating manner. Therefore, as used in the claims, the outer ring 2 and the inner ring 3 correspond to a "stationary raceway ring" and a "rotating raceway ring", respectively, and the outer ring spacer 4 and the inner ring spacer 5 correspond to a "stationary spacer" and a "rotating spacer", respectively. The spindle 7 corresponds to a "rotating member" and the housing 6 corresponds to a "stationary member". The same applies to other embodiments described later.

The outer rings 2, 2 and the outer ring spacer 4 are loosely fitted to, for example, the inner circumferential surface of the housing 6, and are axially positioned by a stepped portion 6a if the housing 6 and an end face cover 40. The inner rings 3, 3 and the inner ring spacer 5 are tightly fitted to, for example, the spindle 7, and are axially positioned by positioning spacers 41 and 42 located on opposite sides thereof. The positioning spacer 42 on the left side in the drawing is fixed with a nut 43 that is screwed to the spindle 7.

The cooling structure will now be described. As shown in FIG. 2, which is a partially enlarged view of FIG. 1, the outer ring spacer 4 includes an outer ring spacer body 11 and ring-shaped lubrication nozzles 12, 12, which are members formed separately from the outer ring spacer body 11. The outer ring spacer body 11 is formed to have a substantially T-shaped cross section, and the lubrication nozzles 12, 12 are fixed on axially opposite sides of the outer ring spacer body 11 so as to be disposed symmetrical to each other. The inner diameter dimension of the outer ring spacer body 11 is larger than the inner diameter dimension of the lubrication nozzles 12, 12. Accordingly, on the inner circumferential surface of the outer ring spacer 4, a recessed portion 13 is formed that is composed of the inner circumferential surface of the outer ring spacer body 11 and side surfaces of the lubrication nozzles 12, 12 that are connected with the inner circumferential surface. The recessed portion 13 is an annular groove having a rectangular cross section. The inner circumferential surface of a portion the outer ring spacer 4 other than the recessed portion 13, i.e., the inner circumferential surfaces of the lubrication nozzles 12, 12 and the outer circumferential surface of the inner ring spacer 5 confront each other with a minute radial clearance $\delta a$ interposed therebetween. Accordingly, a space 14 having a larger radial width than other spaces is formed between the recessed portion 13 and the outer circumferential surface of the inner ring spacer 5.

The outer ring spacer body 11 is provided with a nozzle hole 15 for injecting a compressed air A for cooling towards the outer circumferential surface of the inner ring spacer 5. The nozzle hole 15 has an outlet 15a which is open to the recessed portion 13 on the inner circumferential surface of the outer ring spacer 4. In the present example, a plurality of (e.g., as shown in FIG. 3, three) nozzle holes 15 are provided, and they are disposed equidistantly in the circumferential direction.

Figure 2:
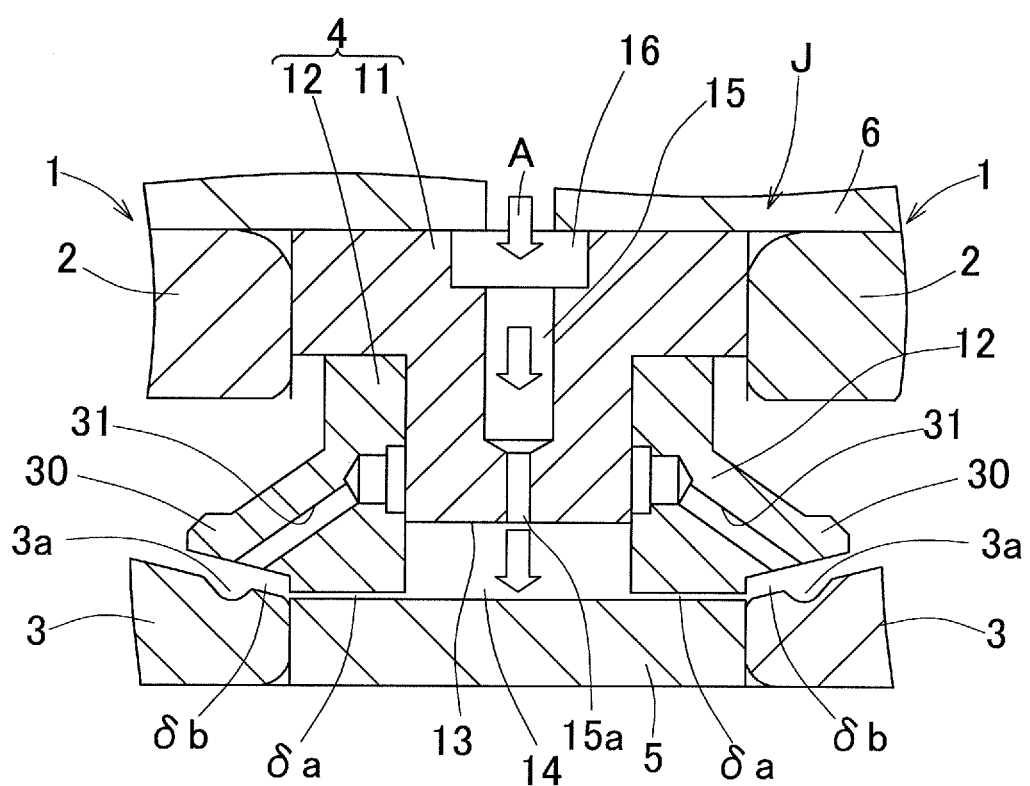
FIG. 2 is an enlarged cross-sectional view of a portion of the cooling structure for a bearing device.
Figure 3:
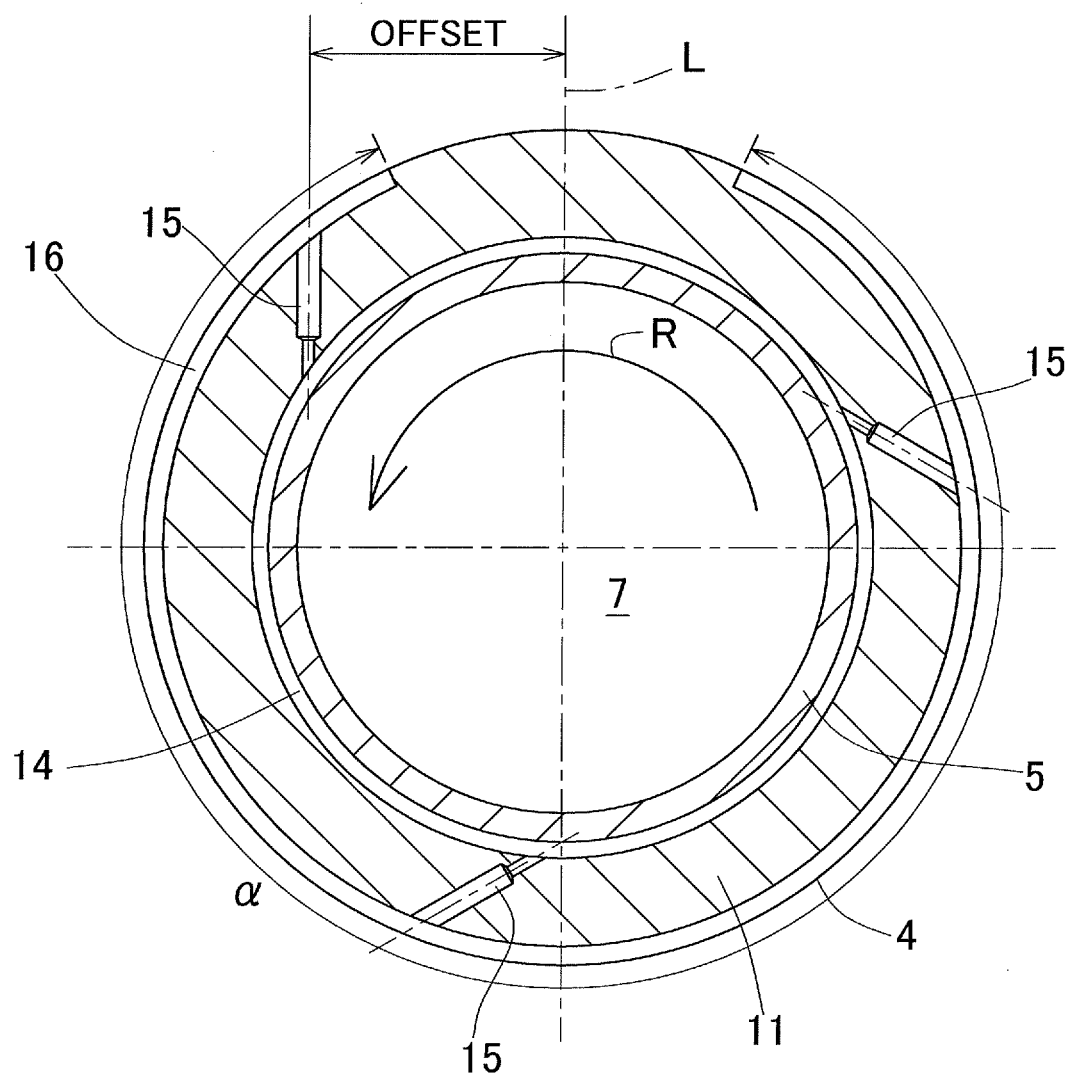
FIG. 3 is a cross-sectional view taken along the line in FIG. 1.

As shown in FIG. 3, each of the nozzle holes 15 is disposed so as to be inclined forwardly in a rotation direction R of the inner ring spacer 5. In other words, the linear axis of the nozzle hole 15 is at a position offset, from an arbitrary straight line L extending in the radial direction on a cross section perpendicular to the axis of the outer ring spacer 4, in a direction orthogonal to the straight line L. The reason that the nozzle hole 15 is offset is to cause the compressed air A to act as a swirl flow in the rotation direction R of the inner ring spacer 5 so as to improve the cooling effect. In FIGS. 1 and 2, the outer ring spacer 4 is shown in a cross section passing through the center line of the nozzle hole 15.

The outer ring spacer body 11, shown in FIG. 3, has an outer circumferential surface is formed with an introduction groove 16 for introducing the compressed air A into the nozzle holes 15 from the outside of the bearing. The introduction groove 16 is provided at an axially intermediate portion of the outer circumferential surface of the outer ring spacer 4, and is formed in a circular arc shape in communication with the nozzle holes 15. The introduction groove 16 is provided on the outer circumferential surface of the outer ring spacer body 11 so as to extend over an angle range $\alpha$, which indicates a major portion in the circumferential direction except for the position in the circumferential direction at which a later-described air-oil supply path (not shown) is provided. As shown in FIG. 1, a compressed air introduction path 45 is provided in the housing 6, and the introduction groove 16 is configured to be in communication with the compressed air introduction path 45. An air supply device (not shown) that supplies the compressed air A to the compressed air introduction hole 45 is provided on the outside of the housing 5.

A lubrication structure will now be described. As shown in FIG. 1, the outer ring spacer 4 includes the lubrication nozzles 12, 12 for supplying air and oil into the bearing. Each lubrication nozzle 12 includes a distal end portion 30 that protrudes into the bearing, i.e., into a bearing space defined between the outer ring 2 and the inner ring 3 so as to confront the outer circumferential surface of the inner ring 3 with an annular clearance $\delta b$ (FIG. 2) for air-oil passage disposed therebetween. In other words, the distal end portion 30 of the lubrication nozzle 12 is inserted into the bearing so as to lie over the outer circumferential surface of the inner ring 3. In addition, the distal end portion 30 of the lubrication nozzle 12 is disposed radially inwardly of the inner circumferential surface of the retainer 9.

As shown in FIG. 2, the lubrication nozzle 12 is formed with an air-oil supply hole 31 for supplying air and oil into the annular clearance δb between the lubrication nozzle 12 and the outer circumferential surface of the inner ring 3. The air-oil supply hole 31 is inclined so as to extend to the inner diameter side toward the bearing, and has an outlet open to the inner circumference side of the distal end portion 30. Air and oil is supplied to the air-oil supply hole 31 through an air-oil supply path (not shown) provided in the housing 6 and the outer ring spacer body 11. The outer circumferential surface of the inner ring 3 is, at a location thereof on an extension of the air-oil supply hole 31, formed with an annular recessed portion 3a is provided. The oil of the air and oil injected from the lubrication nozzle 12 is accumulated in the annular recessed portion 3a, and the oil is guided to the central side of the bearing along the outer circumferential surface, which is an inclined surface, of the inner ring 3 by the centrifugal force resulting from the rotation of the inner ring 3.

An exhaust structure will now be described. The bearing device J is provided with an exhaust path 46 for discharging the compressed air for cooling and the air and oil for lubrication. The exhaust path 46 includes an exhaust groove 47 provided at a portion of the outer ring spacer body 11 in the circumferential direction, and a radial exhaust hole 48 and an axial discharge hole 49 that are provided in the housing 6 and are in communication with the exhaust groove 47. The exhaust groove 47 of the outer ring spacer body 11 is formed at a position in the circumferential direction that is diagonal from the position at which the air-oil supply path is provided. In the present example, three exhaust grooves 47 are disposed equidistantly in the circumferential direction.

The operation of a cooling structure for a bearing device having the above-described configuration will now be described. As shown in FIG. 2, the compressed air A for cooling is sprayed toward the outer circumferential surface of the inner ring spacer 5 from each nozzle hole 15 provided in the outer ring spacer 4. When the compressed air A is injected from the inside of the narrow nozzle hole 15 into the wide space 14, the compressed air A undergoes adiabatic expansion. Where V1 represents the volume of the compressed air in the nozzle hole 15, T1 represents the temperature thereof, V2 represents the volume of the compressed air in the space 14, and T2 represents the temperature thereof, V1<V2 and T1>T2 are satisfied according to a gas state equation and the first law of thermodynamics. That is, in the space 14, the temperature of the compressed air A is decreased and the volume is increased. As a result of the volume increase, the flow velocity of the compressed air A is accelerated. In this way, by spraying the low-temperature, high-speed compressed air A to the inner ring spacer 5, the inner ring spacer 5 is efficiently cooled.

Since each nozzle hole 15 is inclined forwardly in the rotation direction R of the inner ring spacer 5 shown in FIG. 3, the compressed air A injected from the nozzle hole 15 flows in the circumferential direction while swirling along the outer circumferential surface of the inner ring spacer 5, and is discharged through the exhaust path 46 in FIG. 1 to the outside of the bearing. Since the compressed air A swirls, the compressed air A is in contact with the outer circumferential surface of the inner ring spacer 5 for a longer time as compared with when the compressed air directly flows in the axial direction of the nozzle hole 15, thus making it possible to more efficiently cool the inner ring spacer 5. Accordingly, it is possible to more efficiently cool the inner ring spacer 5.

In this way, as a result of the inner ring spacer 5 being efficiently cooled, it is possible to effectively cool the inner ring 3 of the rolling bearing 1 and the spindle 7 via the inner ring spacer 5. This cooling structure can improve the cooling efficiency simply by contriving the structure so as to provide the annular recessed portion 13 on the inner circumferential surface of the outer ring spacer 4 and cause the nozzle holes 15 to be inclined. Therefore, it is not necessary to increase the output of the air supply device that supplies the compressed air A, making it possible to suppress the power consumption.

In addition, the provision of the recessed portion 13 on the inner circumferential surface of the outer ring spacer 4 has the following effect. That is, the compressed air A injected into the space 14 between the recessed portion 13 and the inner ring spacer 5 is discharged to the outside of the bearing through the radial clearance δa between the outer ring spacer 4 and the inner ring spacer 5 located on opposite sides of the recessed portion 13. At this time, at least a part of the compressed air A flows into the bearing. Since the radial clearance δa is narrower than the space 14, the flow velocity of the compressed air A flowing through the radial clearance δa is made uniform at various portions in the circumferential direction, so that the flow velocity of the compressed air A flowing into the bearing is made uniform. Accordingly, it is possible to reduce the collision noise between the compressed air A and the rotating rolling elements 9.

Figure 4:
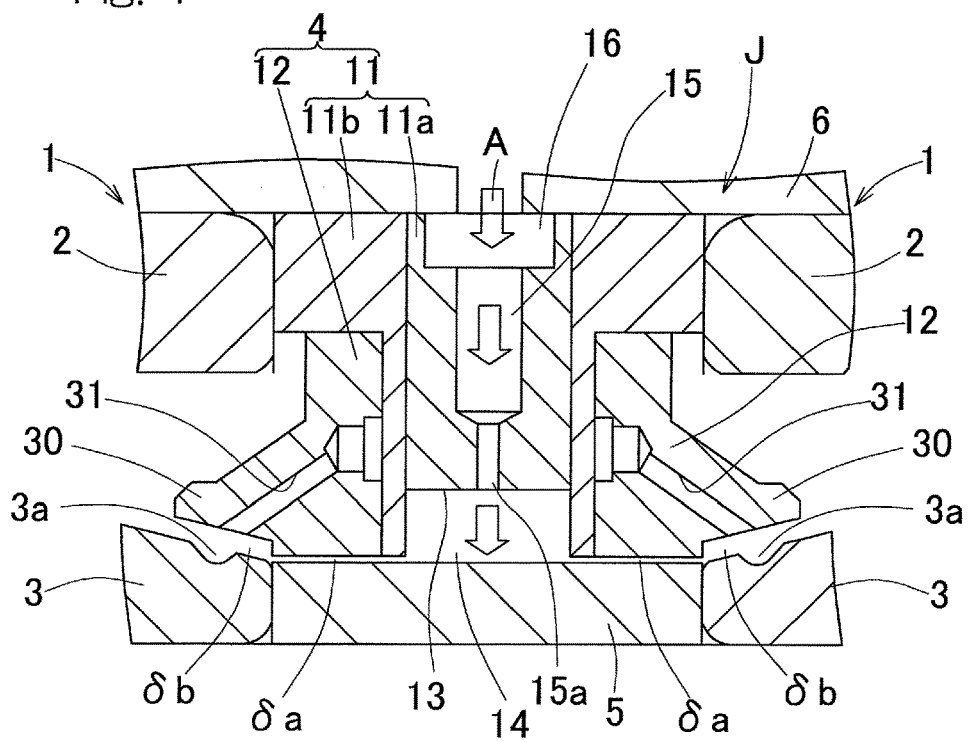
FIG. 4 is a longitudinal cross sectional view of a portion of a cooling structure for a bearing device according to a second embodiment of the present invention.

In the case of the present embodiment, the recessed portion 13 is configured as an annular groove having a rectangular cross section along the axial direction. Accordingly, the recessed portion 13 has a constant depth, so that the processing is facilitated. By separating a portion constituting the bottom surface of the recessed portion 13, i.e., a major portion 11a in the axial direction from the other portion 11b as with the second embodiment shown in FIG. 4, the outer ring spacer body 11 is formed by combining a plurality of members having a relatively simple shape, so that the processing is further facilitated.

Figure 5:
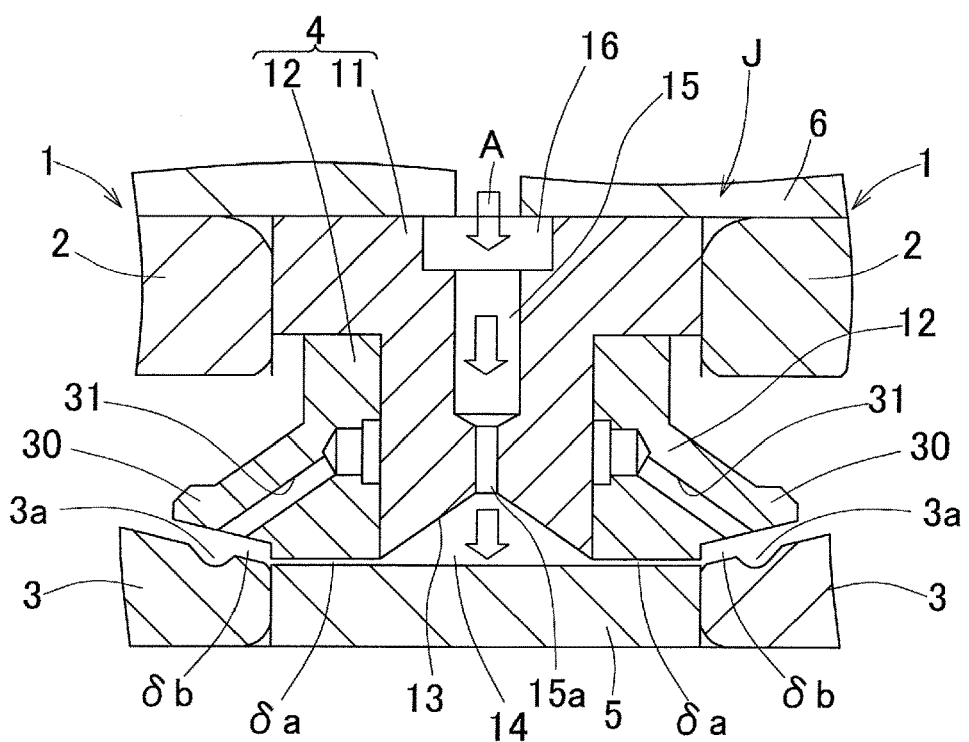
FIG. 5 is a longitudinal cross sectional view of a portion of a cooling structure for a bearing device according to a third embodiment of the present invention.

As illustrated with the third embodiment shown in FIG. 5, the recessed portion 13 on the inner circumferential surface of the outer ring spacer 4 may be an annular groove having a chevron-shaped cross section (the cross sectional shape along the axial direction is a chevron shape) in which a portion formed with the outlet 15a of each nozzle hole 15 is most recessed, and the recessed amount gradually decreases from the most recessed portion toward at least one side (both sides in the example shown in FIG. 5) in the axial direction. In the illustrated example, the bottom surface of the recessed portion 13 is tapered, but the present invention is not limited thereto. In this case, it is possible to suppress the resistance of the compressed air A flowing out of the space 14 between the recessed portion 13 of the outer ring spacer 4 and the inner ring spacer 5, making the flow velocity of the compressed air A flowing into the bearing even more uniform.

Next, fourth to seventh embodiments of the present invention will be described with reference to FIGS. 6 to 17C. In these embodiments, parts that are the same as or correspond to those in FIGS. 1 to 5 that are used in the description of the first to third embodiments are denoted by the same reference numerals, and differences from these embodiments will be described, whereas the detailed description thereof has been omitted.

First, a cooling structure for a bearing device according to the fourth embodiment will be described with reference to FIGS. 6 to 9.

Figure 6:
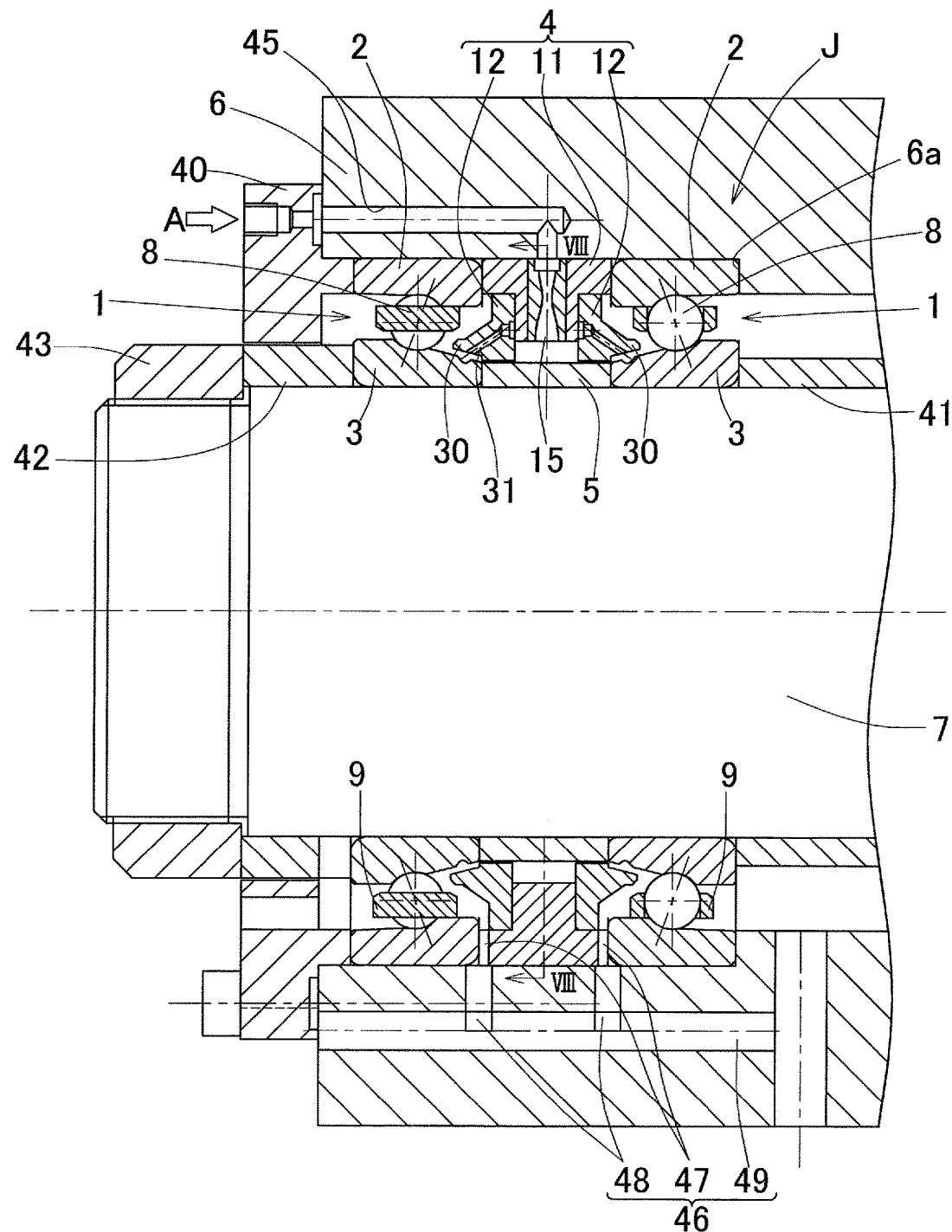
FIG. 6 is a longitudinal cross sectional view of a machine tool spindle device including a cooling structure for a bearing device according to a fourth embodiment of the present invention.
Figure 7:
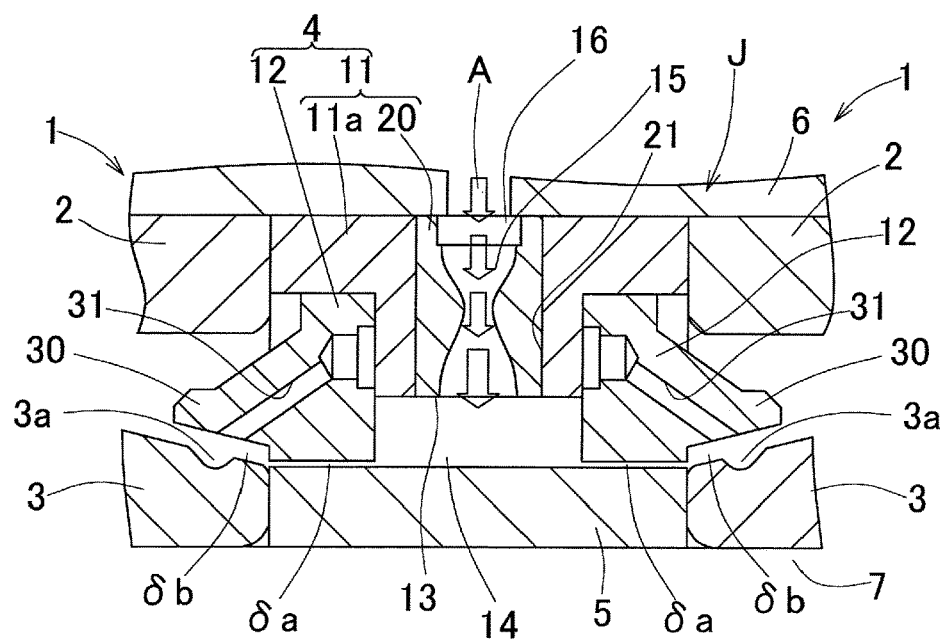
FIG. 7 is an enlarged cross-sectional view of a portion of the cooling structure for a bearing device.

In the cooling structure for a bearing device according to the fourth embodiment, unlike the first to third embodiments, each of the nozzle holes 15 provided in the outer ring spacer body 11 has a shape in which an intermediate portion in the length direction is narrowed so as to enable a supersonic flow, as shown in FIG. 6 and FIG. 7 which shows an enlarged view of a portion shown in FIG. 6. Examples of this shape include the shape of a Laval nozzle. As with the first to third embodiments, the outlet 15a of the nozzle hole 15 is open to the recessed portion 13 on the inner circumferential surface of the outer ring spacer 4.

Figure 8:
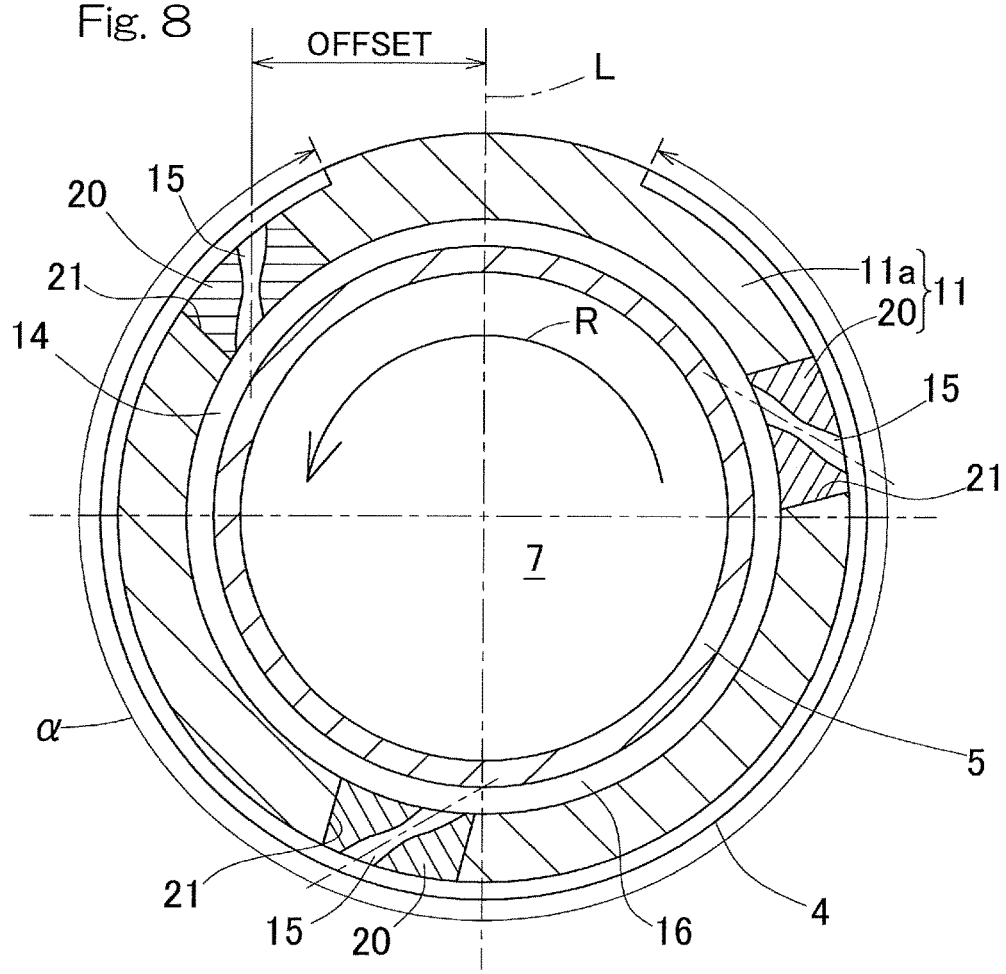
FIG. 8 is a cross-sectional view taken along the line VIII-VIII in FIG. 6.

As shown in FIG. 8, which corresponds to FIG. 3, each of the nozzle holes 15 is inclined forwardly in the rotation direction R of the inner ring spacer 5. That is, the axis of the nozzle hole 15 is at a position offset, from a given straight line L in the radial direction on a cross section perpendicular to the axis of the outer ring spacer 4, in a direction orthogonal to the straight line L. The reason that the nozzle hole 15 is offset is also the same as that in the first embodiment.

Figure 9:
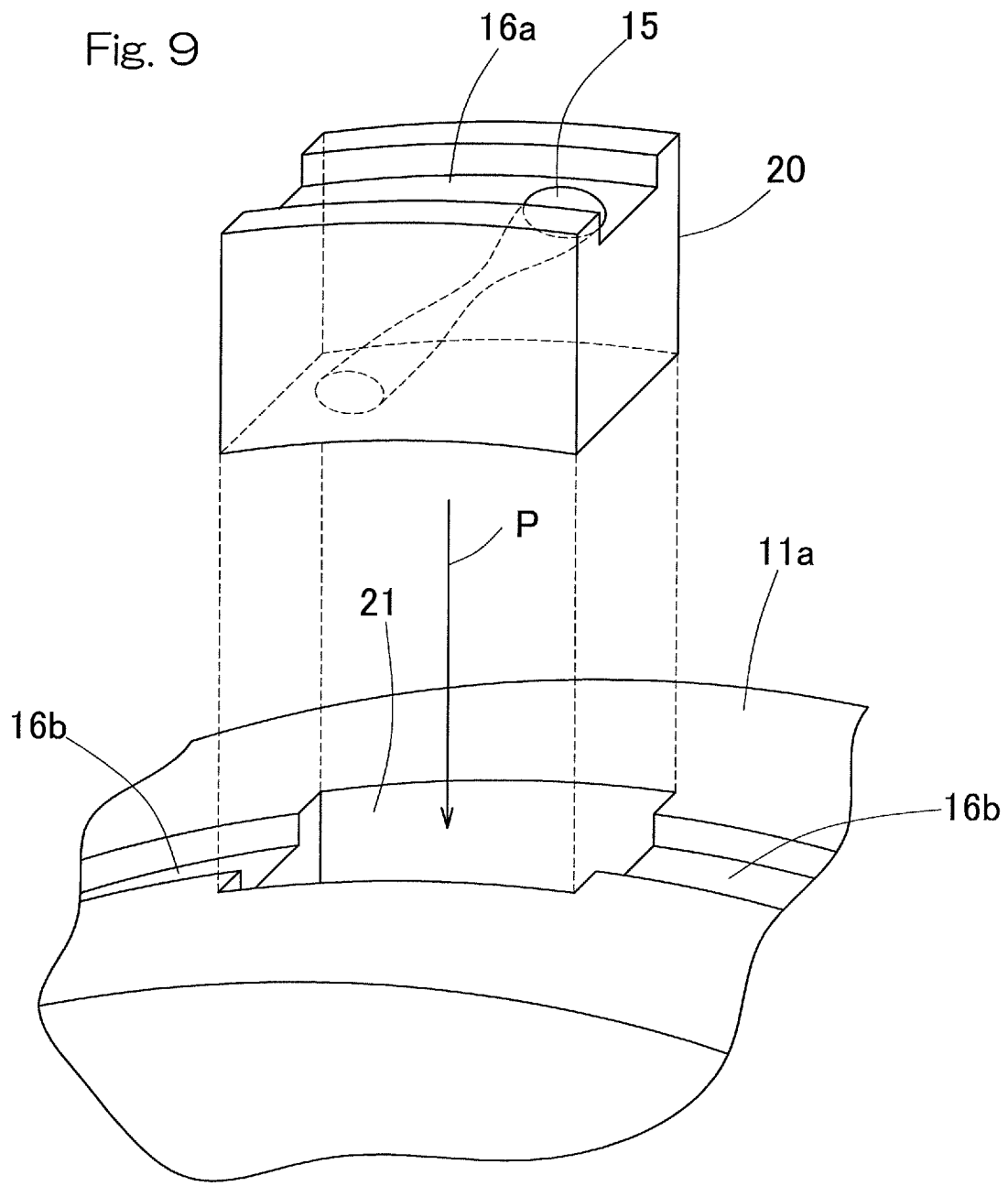
FIG. 9 is an exploded perspective view of a nozzle attachment portion of the cooling structure for a bearing device.

As shown in FIG. 9, a portion 20 of the outer ring spacer body 11 that constitutes the nozzle hole 15 (hereinafter referred to as "nozzle hole forming portion 20") is provided for each nozzle hole 15, and each of the nozzle hole forming portions 20 is formed separately from the other portion 11a that constitutes the most portion of the outer ring spacer body 11. Although each of the nozzle hole forming portions 20 has a substantially rectangular shape as viewed from the radial direction in the illustrated example, it may have another shape. Each of the nozzle hole forming portions 20 is fixed to the other portion 11a by being fitted in the direction indicated by the arrow P by press-fitting or the like into a fitting hole 21 formed so as to pass through the outer ring spacer body 11 in the radial direction. The introduction groove 16 of the outer ring spacer body 11 is composed of groove portions 16a and 16b that are respectively formed on the outer circumferential surface of the nozzle hole forming portion 20 and the outer circumferential surface of the other portion 11a. The introduction groove 16 is in communication with the compressed air introduction path 45 provided in the housing 6 shown in FIG. 6.

The nozzle hole forming portion 20 is made of, for example, a resin material, and may be produced by injection molding or the like. Accordingly, nozzle holes 15 having various shapes suitable for high-speed jetting such as that of a Laval nozzle in which the intermediate portion in the flow direction of the compressed air A is narrow and the shape of the longitudinal cross section along the flow direction is non-uniform can be formed with high accuracy and high productivity. It is difficult for the nozzle holes 15 having a non-uniform longitudinal cross sectional shape to be processed on a metal casting by cutting. The other portion 11a of the outer ring spacer body 11 and components (except for the retainer 9) other than the outer ring spacer body 11 are made of a metal such as bearing steel.

The lubrication structure and the exhaust structure of the fourth embodiment are basically the same as those of the first embodiment described above, and the detailed description thereof has been omitted.

The operation of the cooling structure of the fourth embodiment is also the same as that of the first embodiment described above, and the detailed description thereof has been omitted. However, especially in the case of the fourth embodiment, the inner ring spacer 5 can be efficiently cooled by the following configuration.

In the fourth embodiment, the nozzle hole 15 is configured in a shape, such as that of a Laval nozzle, that enables a supersonic flow. Accordingly, by adjusting the pressure, the flow rate, and the like of the compressed air A by using the air supply device, the compressed air A having a supersonic velocity is injected from the nozzle hole 15. In the case of the illustrated example, the compressed air A is injected into the space 14 between the recessed portion 13 on the inner circumferential surface of the outer ring spacer 4 and the outer circumferential surface of the inner ring spacer 5, so that the compressed air A undergoes adiabatic expansion in the space 14, thus decreasing the temperature and increasing the volume. As a result of the volume increase, the flow velocity is further accelerated. In this manner, by spraying the low-temperature, ultra-high speed compressed air A to the inner ring spacer 5, the inner ring spacer 5 is efficiently cooled.

The fourth embodiment is configured such that a nozzle hole forming portion 20 is individually provided for each nozzle hole 15, and each of the nozzle hole forming portion 20 is fitted into the fitting hole 21 provided in the other portion 11a of the outer ring spacer body 11. When a common nozzle hole forming portion 20 is used for the nozzle holes 15, the nozzle hole forming portion 20 has an annular shape or a shape similar to an annular shape, resulting in a form in which the other portion 11a is divided into axially opposite side portions by the nozzle hole forming portion 20. With this form, the rigidity of the outer ring spacer 4 in the axial direction is reduced when the nozzle hole forming portion 20 is made of a resin material. With the configuration of the present embodiment, the other portion 11a is not divided into axially opposite side portions by the nozzle hole forming portions 20, so that it is possible to prevent a reduction in the rigidity of the outer ring spacer 4 in the axial direction.

Figure 10:
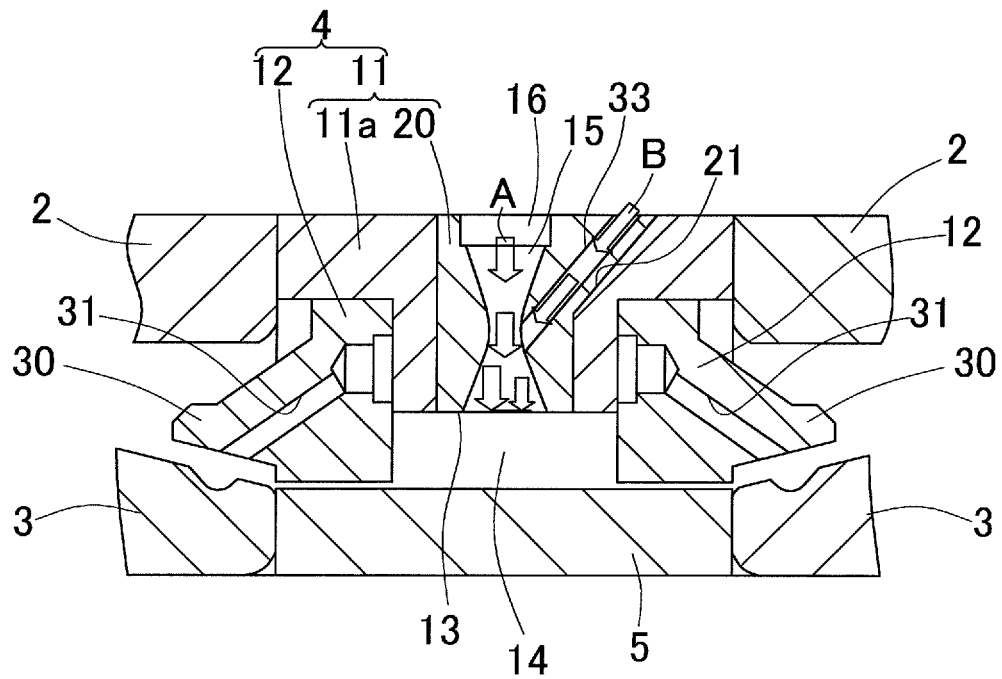
FIG. 10 is a longitudinal cross sectional view of a portion of a cooling structure for a bearing device according to a fifth embodiment of the present invention.

In the fifth embodiment shown in FIG. 10, an air hole 33 leading to the outside of the bearing device is provided at an intermediate portion, in the flow direction of the compressed air A, of the nozzle hole 15 having a shape that can generate a supersonic flow. In this case, the negative pressure generated by the dynamic pressure of the compressed air A flowing through the nozzle hole 15 causes air B from the outside of the bearing device to be sucked into the nozzle hole 15 through the air hole 33. Accordingly, the flow rate of the compressed air A injected from the nozzle hole 15 is increased, so that the cooling effect is improved.

Figure 11:
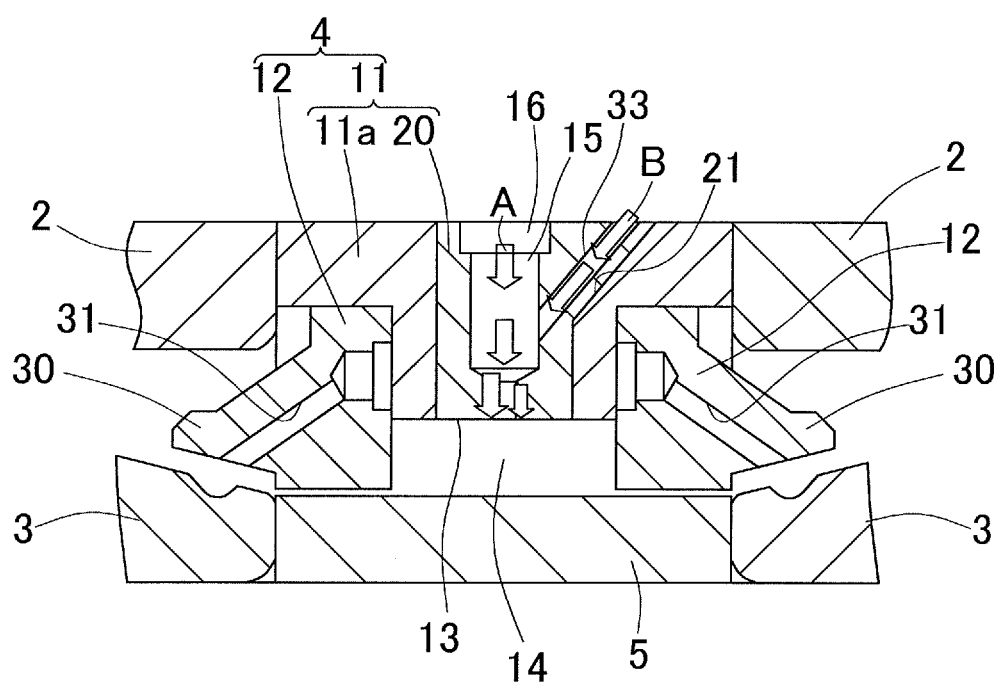
FIG. 11 is a longitudinal cross sectional view of a portion of a cooling structure for a bearing device according to a sixth embodiment of the present invention.

The sixth embodiment shown in FIG. 11 illustrates an example in which the air hole 33 is formed in the nozzle hole 15 having a general shape. In each of the fifth and sixth embodiments shown in FIGS. 10 and 11, as a result of the provision of the air hole 33, the cross sectional shapes of the nozzle hole forming portion 20 and the fitting hole 21 are slightly different from those of the fourth embodiment shown in FIG. 7. The rest of the configuration is the same as that shown in FIG. 7.

Figure 12:
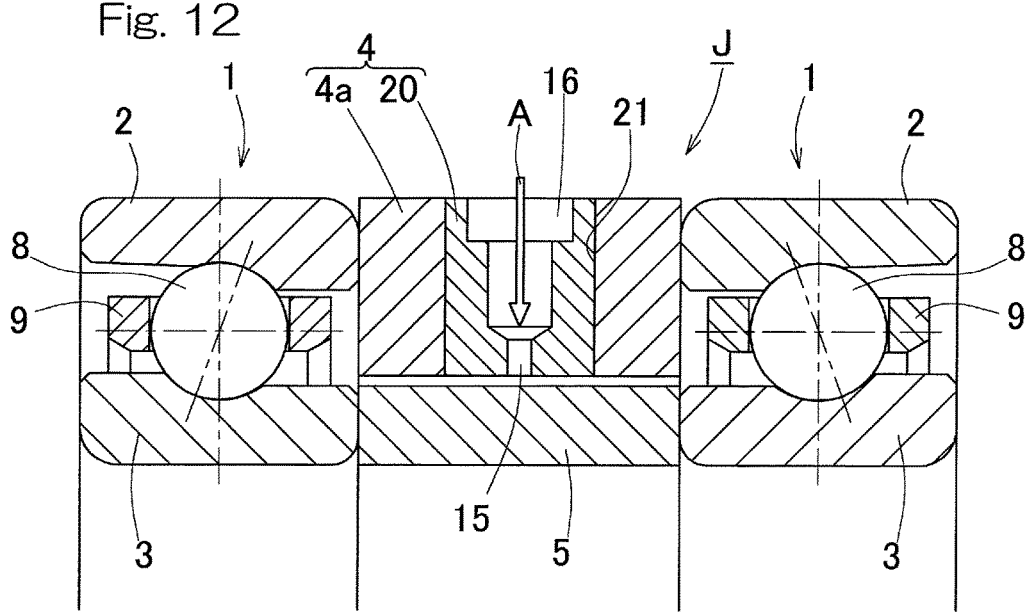
FIG. 12 is a longitudinal cross sectional view of a cooling structure for a bearing device according to a seventh embodiment of the present invention.
Figure 13:
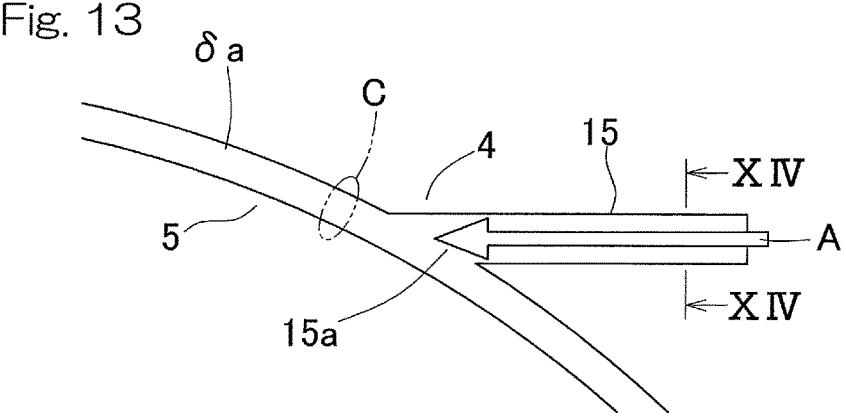
FIG. 13 is a diagram showing a peripheral portion of a nozzle hole outlet of the cooling structure for a bearing device, as viewed from the axial direction.
Figure 14A:
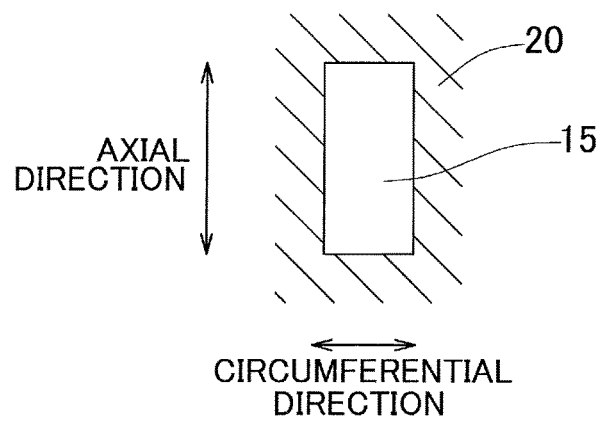
FIG. 14A is a cross-sectional view taken along the line XIV-XIV in FIG. 13, showing an example of the nozzle hole.
Figure 14B:
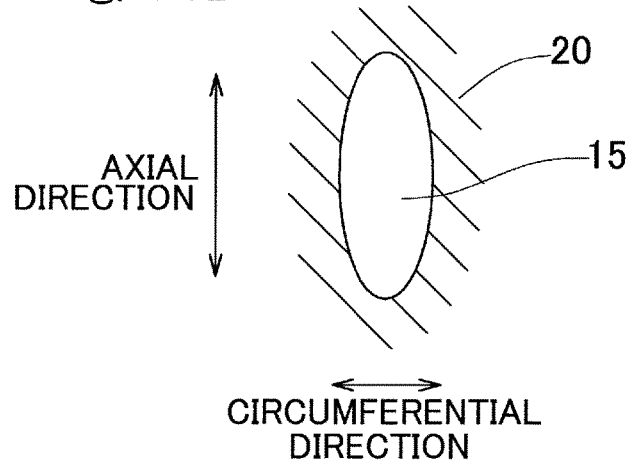
FIG. 14B is a cross-sectional view taken along the line XIV-XIV in FIG. 13, showing another example of the nozzle hole.

FIGS. 12 to 14B show a seventh embodiment. Whereas the longitudinal cross section of the nozzle hole 15 of the above-described embodiments along the flow direction of the compressed air A has a non-uniform shape, the transverse cross section, of the nozzle hole 15 of the seventh embodiment, that is orthogonal to the flow direction of the compressed air A has a non-uniform shape. That is, to improve the cooling efficiency, the transverse cross-sectional shape in the vicinity of the nozzle hole outlet 15a is configured as a flattened shape having a larger dimension along the axial direction than a dimension along the circumferential direction of the bearing. For example, the transverse cross-sectional shape is configured as a rectangular shape that is elongated in the axial direction as shown in FIG. 14A, or is configured as an oval shape that is elongated in the axial direction as shown in FIG. 14B. In this specification, the flattened shape is not limited to a flat shape having an excessively longer dimension along the axial direction than a dimension along the circumferential direction of the bearing, and includes a shape having a slightly longer dimension along the axial dimension than a dimension along the circumferential dimension.

Figure 15:
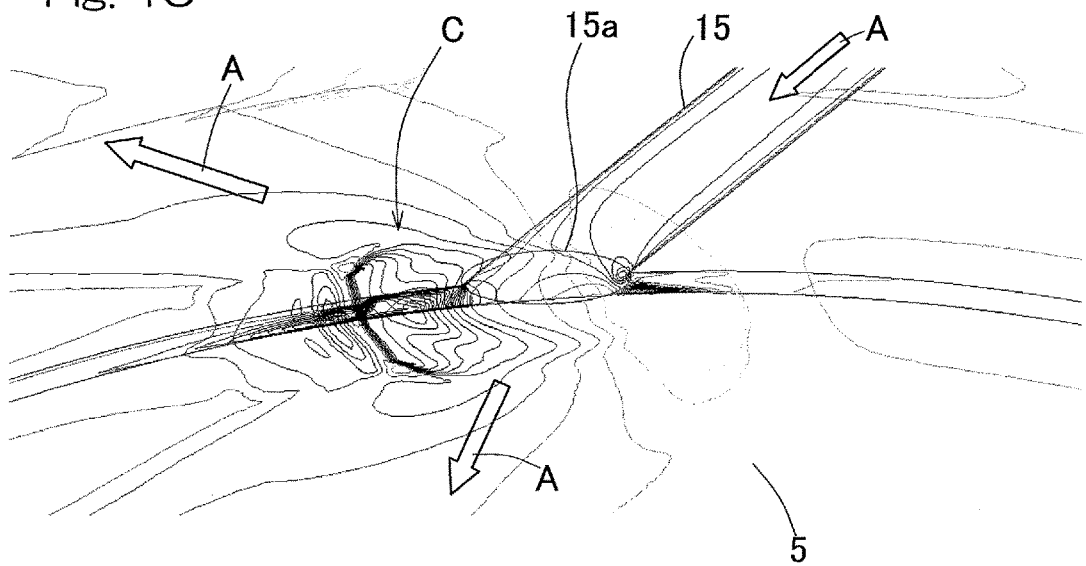
FIG. 15 is a diagram showing a pressure distribution in the vicinity of an outlet of the nozzle hole in a state in which compressional waves are generated.
Figure 16:
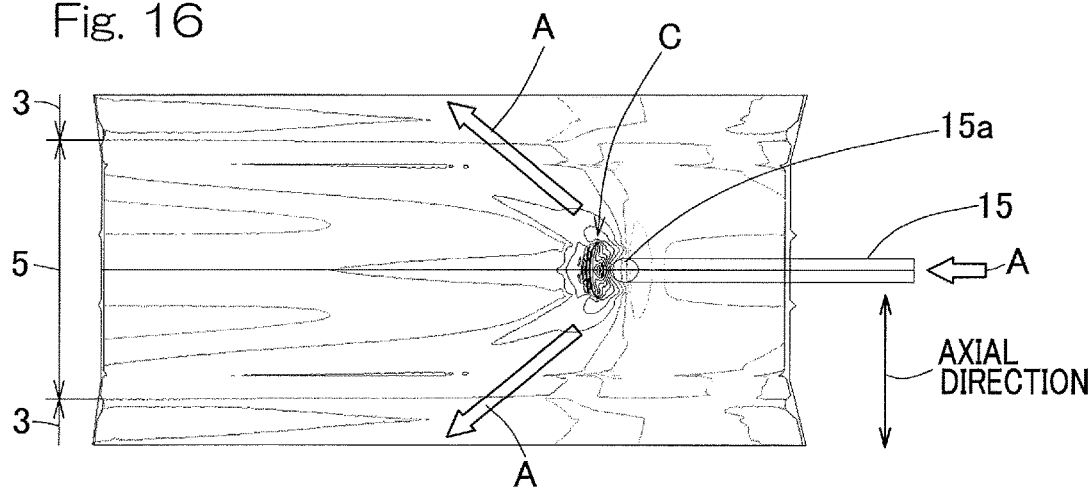
FIG. 16 is a diagram showing a temperature distribution in the vicinity of the outlet of the nozzle hole in a state in which compressional waves are generated.

The reason that the cooling efficiency is improved by configuring the transverse cross-sectional shape in the vicinity of the nozzle hole outlet 15a as a flattened shape will now be described. As shown in FIG. 13, when a large amount of the compressed air A is injected from the nozzle hole 15 toward the inner ring spacer 5, the flow velocity of the compressed air A reaches the maximum speed (e.g., a sound velocity) at the nozzle hole outlet 15a. At this time, when the clearance δa between the nozzle hole outlet 15a and the rotating spacer 5 is narrow and the transverse cross-sectional shape in the vicinity of the nozzle hole outlet 15a is a circular shape, the pressure between the nozzle hole outlet 15a and the inner ring spacer 5 tends to be increased, so that compressional waves are generated in the clearance δa in the vicinity C of the nozzle hole outlet 15a. The larger the supply amount of the compressed air A is, the intenser the generated compressional waves are. When compressional waves are generated, a direct flow of the compressed air A injected from the nozzle hole 15 is impeded, and the compressed air A diffuses in an axial direction orthogonal to the plane of the drawing, as shown in FIGS. 15 and 16. Accordingly, the time for which the compressed air A is in contact with the outer circumferential surface of the inner ring spacer 5 is shortened, resulting in a reduction in the cooling effect. FIG. 15 shows a pressure distribution in the vicinity of the outlet 15a of the nozzle hole 15 in a state in which compressional waves are generated. FIG. 16 shows a temperature distribution in the vicinity of the outlet 15a of the nozzle hole 15 in a state in which compressional waves are generated.

Figure 17A:
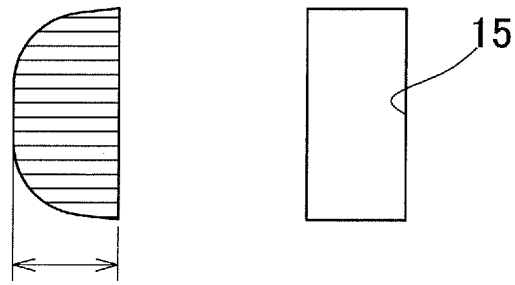
FIG. 17A is a diagram showing example 1 of the relationship between the transverse cross-sectional shape in the vicinity of the outlet of the nozzle hole and the mass flow rate.
Figure 17B:
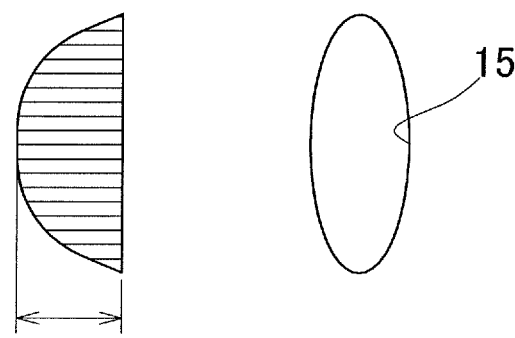
FIG. 17B is a diagram showing example 2 of the relationship between the transverse cross-sectional shape in the vicinity of the outlet of the nozzle hole and the mass flow rate.
Figure 17C:
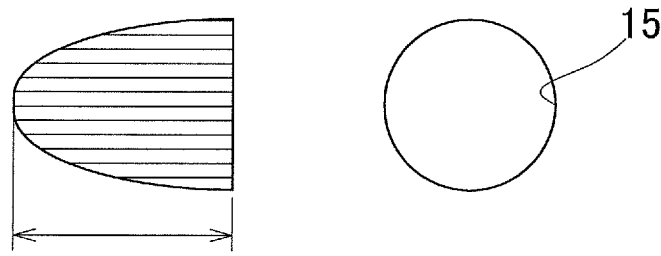
FIG. 17C is a diagram showing example 3 of the relationship between the transverse cross-sectional shape in the vicinity of the outlet of the nozzle hole and the mass flow rate.

It is considered that compressional waves tend to be generated when the transverse cross-sectional shape in the vicinity of the nozzle hole outlet 15a is a circular shape since the inflow amount (mass flow rate) of the compressed air A to the clearance δa between the nozzle hole outlet 15a and the inner ring spacer 5 is locally increased at the central portion in the axial direction that is an extension of the center of the nozzle hole 15, as in example 3 shown in FIG. 17C. When the transverse cross-sectional shape in the vicinity of the nozzle hole outlet 15a is a flattened shape as the nozzle holes 15 in FIGS. 14A and 14B, the inflow amount of the compressed air A is made uniform in the axial direction as in examples 1 and 2 shown in FIGS. 17A and 17B. Accordingly, intense compressional waves will not be generated, allowing the compressed air A to smoothly flow in the circumferential direction without diffusing in the axial direction.

As shown in FIG. 12, the outer ring spacer 4 does not have a lubrication nozzle in the bearing device J of the seventh embodiment, there is no distinction between the outer ring spacer and the outer ring spacer body. Accordingly, each of the nozzle hole forming portions 20 is formed separately from the other portion 4a occupying the most portion of the outer ring spacer 4, and is fitted into the fitting hole 21 provided in the other portion 4a.

Although each of the foregoing embodiments describes a case where the rolling bearing 1 is used for inner ring rotation, the present invention is also applicable to a case where the rolling bearing 1 is used for outer ring rotation. In that case, for example, a shaft (not shown) fitted to the inner circumference of the inner ring 3 is the stationary member, and a roller (not shown) fitted to the outer circumference of the outer ring 2 is the rotating member.

In addition to the embodiments described above, the present invention includes the following modes 1 to 5 that do not include the recessed portion 13 as a constituent feature.

[Mode 1]

A cooling structure for a bearing device, the bearing device including a rolling bearing having a stationary raceway ring and a rotating raceway ring opposing inside and outside of the rolling bearing, a stationary spacer adjacent to the stationary raceway ring and a rotating spacer adjacent to the rotating raceway ring, the stationary raceway ring and the stationary spacer being provided in, out of a stationary member and a rotating member, the stationary member, and the rotating raceway ring and the rotating spacer being provided in the rotating member, in which, in the stationary spacer, a nozzle hole for injecting compressed air for cooling toward a circumferential surface of the rotating spacer at which the spacers oppose each other is provided so as to be inclined forwardly in a rotation direction of the rotating spacer, a portion of the stationary spacer that constitutes the nozzle part is formed separately from another portion, and one or both of cross sections of the nozzle hole, the cross sections being a transverse cross section orthogonal to a flow direction of the compressed air and a longitudinal cross section along the flow direction of the compressed air, have a non-uniform shape.

[Mode 2]

The cooling structure for a bearing device as described in mode 1, in which the stationary spacer includes a plurality of the nozzle holes in a circumferential direction, and a portion constituting each of the nozzle holes is individually fitted into a fitting hole provided in said another portion.

[Mode 3]

The cooling structure for a bearing device as described in mode 1 or 2, in which a transverse cross-sectional shape in the vicinity of the outlet of the nozzle hole is a flattened shape having an axial dimension longer than a circumferential dimension.

[Mode 4]

The cooling structure for a bearing device as described in any one of modes 1 to 3, in which a longitudinal cross section of the nozzle hole has a shape in which an intermediate portion in a length direction is narrow so as to enable a supersonic flow.

[Mode 5]

The cooling structure for a bearing device as described in any one of modes 1 to 4, in which an air hole leading to outside of the bearing device is provided at an intermediate portion, of the nozzle hole, in the flow direction of the compressed air.

Although the present invention has been fully described in connection with the preferred embodiments and modes thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . Rolling bearing
2 . . . Outer ring (stationary raceway ring)
3 . . . Inner ring (rotating raceway ring)
4 . . . Outer ring spacer (stationary spacer)
5 . . . Inner ring spacer (rotating spacer)
6 . . . Housing (stationary member)
7 . . . Spindle (rotating member)
11 . . . Outer ring spacer body
11a . . . Portion forming nozzle hole
11b . . . Other portion
15 . . . Nozzle hole
15a . . . Outlet (nozzle hole outlet)
20 . . . Nozzle hole forming portion (portion forming the nozzle hole)
21 . . . Fitting hole
33 . . . Air hole
A . . . Compressed air
J . . . Bearing device

What is claimed is:

1. A cooling structure for a bearing device, the bearing device including a rolling bearing having a stationary raceway ring and a rotating raceway ring opposing inside and outside of the rolling bearing, the cooling structure comprising:
a stationary spacer adjacent to the stationary raceway ring and including an outer ring spacer body and ring-shaped lubrication nozzles which are formed separately from the outer ring spacer body and fixed on axially opposite sides of the outer ring spacer body, each lubrication nozzle having an inner diameter smaller than that of the outer ring spacer body;
a rotating spacer adjacent to the rotating raceway ring;
an annular recessed portion provided on a portion of a circumferential surface of the stationary spacer that confronts the rotating spacer; and
a nozzle hole formed in the outer ring spacer body and configured to inject a compressed air from an outlet open to a bottom surface of the recessed portion toward a portion of a circumferential surface of the rotating spacer that confronts the stationary spacer, the nozzle hole being inclined forwardly in a rotation direction of the rotating spacer,
wherein the recessed portion is an annular groove having a chevron-shaped cross section in which a portion formed with the outlet of the nozzle hole is most recessed, and a recessed amount decreases from the most recessed portion toward at least one side in an axial direction.

2. The cooling structure for a bearing device as claimed in claim 1, wherein
the stationary raceway ring and the stationary spacer are provided in a stationary member,
the rotating raceway ring and the rotating spacer are fitted to a rotating member,
the rotating member is a spindle of a machine tool, and the stationary member is a housing of the machine tool.

3. A cooling structure for a bearing device, the bearing device including a rolling bearing having a stationary raceway ring and a rotating raceway ring opposing inside and outside of the rolling bearing, the cooling structure comprising:
a stationary spacer adjacent to the stationary raceway ring;
a rotating spacer adjacent to the rotating raceway ring;
an annular recessed portion provided on a portion of a circumferential surface of the stationary spacer that confronts the rotating spacer; and
a nozzle hole configured to inject a compressed air from an outlet open to a bottom surface of the recessed portion toward a portion of a circumferential surface of the rotating spacer that confronts the stationary spacer, the nozzle hole being inclined forwardly in a rotation direction of the rotating spacer,
wherein the stationary spacer comprises:
a portion that constitutes the nozzle hole; and
another portion formed separately from the portion that constitutes the nozzle hole,
wherein the nozzle hole has a transverse cross section orthogonal to a flow direction of the compressed air and a longitudinal cross section along the flow direction of the compressed air, one or both of the cross sections having a non-uniform shape, and
wherein a transverse cross-sectional shape in the vicinity of the outlet of the nozzle hole is a flattened shape having an axial dimension longer than a circumferential dimension.

4. A cooling structure for a bearing device, the bearing device including a rolling bearing having a stationary raceway ring and a rotating raceway ring opposing inside and outside of the rolling bearing, the cooling structure comprising:
a stationary spacer adjacent to the stationary raceway ring;
a rotating spacer adjacent to the rotating raceway ring;
an annular recessed portion provided on a portion of a circumferential surface of the stationary spacer that confronts the rotating spacer; and
a nozzle hole configured to inject a compressed air from an outlet open to a bottom surface of the recessed portion toward a portion of a circumferential surface of the rotating spacer that confronts the stationary spacer, the nozzle hole being inclined forwardly in a rotation direction of the rotating spacer,
wherein the stationary spacer comprises:
a portion that constitutes the nozzle hole; and
another portion formed separately from the portion that constitutes the nozzle hole,
wherein the nozzle hole has a transverse cross section orthogonal to a flow direction of the compressed air and a longitudinal cross section along the flow direction of the compressed air, one or both of the cross sections having a non-uniform shape, and
wherein a longitudinal cross section of the nozzle hole has a shape in which an intermediate portion in a length direction is narrower than the remaining portion of the nozzle hole so as to enable a supersonic flow.

5. A cooling structure for a bearing device, the bearing device including a rolling bearing having a stationary raceway ring and a rotating raceway ring opposing inside and outside of the rolling bearing, the cooling structure comprising:
a stationary spacer adjacent to the stationary raceway ring;
a rotating spacer adjacent to the rotating raceway ring;
an annular recessed portion provided on a portion of a circumferential surface of the stationary spacer that confronts the rotating spacer; and
a nozzle hole configured to inject a compressed air from an outlet open to a bottom surface of the recessed portion toward a portion of a circumferential surface of the rotating spacer that confronts the stationary spacer, the nozzle hole being inclined forwardly in a rotation direction of the rotating spacer, wherein the stationary spacer comprises:
- a portion that constitutes the nozzle hole; and
- another portion formed separately from the portion that constitutes the nozzle hole, wherein the nozzle hole has a transverse cross section orthogonal to a flow direction of the compressed air and a longitudinal cross section along the flow direction of the compressed air, one or both of the cross sections having a non-uniform shape, and wherein an air hole leading to outside of the bearing device is provided at an intermediate portion of the nozzle hole, positioned intermediate in the flow direction of the compressed air.

\* \* \* \* \*